UNITED STATES PATENT OFFICE.

HERBERT LEVINSTEIN AND JAMES BADDILEY, OF MANCHESTER, ENGLAND, ASSIGNORS TO LEVINSTEIN LIMITED, OF MANCHESTER, ENGLAND, A LIMITED LIABILITY COMPANY UNDER THE LAWS OF GREAT BRITAIN AND IRELAND.

PRODUCTION OF FAST ORANGE, RED, OR BROWN SHADES ON VEGETABLE FIBERS AND DYESTUFFS THEREFOR.

1,185,413.     Specification of Letters Patent.     Patented May 30, 1916.

No Drawing.     Application filed November 28, 1913. Serial No. 803,567.

*To all whom it may concern:*

Be it known that we, HERBERT LEVINSTEIN, M. Sc., Ph. D., and JAMES BADDILEY, B. Sc., both subjects of the King of Great Britain and Ireland, and both residents of Blackley, Manchester, in the county of Lancaster, England, have invented new and useful Improvements in the Production of Fast Orange, Red, or Brown Shades on Vegetable Fibers and Dyestuffs Therefor, of which the following is a specification.

It has hitherto been found possible to fix certain direct coloring matters on vegetable fibers by means of formaldehyde, thus obtaining in a convenient manner shades of great resistance to washing or to boiling soap. But to produce fast orange, or red shades on the fiber other methods have hitherto had to be employed, such as, for instance, the use of diazotizable dyestuffs.

This invention consists in the production, as hereinafter described, of direct orange, brown and red dyestuffs of great brilliancy, and their fixation, after dyeing on vegetable fiber, with formaldehyde. Shades are thereby obtained which are not only produced in a more simple manner, but are also much faster to boiling soap than are those obtained by developing dyestuffs. The fastness to acids, alkalis, and light is also good.

In carrying this invention into effect for the production of the new dyestuffs we combine with two molecules of resorcin a tetrazo body having the general formula

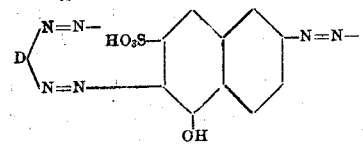

or

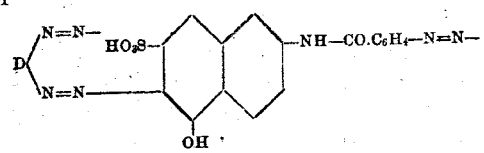

where D is a residue of the general constitution Ar.CO.NH.Ar., where Ar represents an aryl radical.

Example I: 257 parts of metanitrobenzoylmetaphenylenediamin are diazotized by stirring with 69 parts of sodium nitrite and the necessary quantity of hydrochloric acid. The diazo compound thus obtained is mixed in soda alkaline solution with 358 parts of 2-metaaminobenzoylamino-5-naphthol-7-sulfonic acid. When the combination is completed 480 parts of sodium sulfid crystals are added and the mixture heated to about 60° C. until the reduction of the nitro group is completed. The excess of alkali is then neutralized, the dyestuff filtered off, redissolved, precipitated with an excess of hydrochloric acid, and finally tetrazotized by means of 138 parts of sodium nitrite. The mixture is then poured into a strongly alkaline solution of 220 parts or resorcin and stirred until combination is completed. The dyestuff is then isolated by salting out and filtering. It dyes cotton in brilliant orange shades which are fast to light and alkalis, and are unaffected even by strong nitric acid. On after treatment with formaldehyde the dyeings become fast to washing and will stand boiling soap without appreciably losing strength or bleeding.

Example II: The diazo compound obtained from 337 parts metanitrobenzoylparaphenylenediamin sulfonic acid is coupled in soda alkaline solution with 358 parts of 2-metaaminobenzoylamino-5-naphthol-7-sulfonic acid. The monoazo dyestuff thus obtained is treated with 480 parts of sodium sulfid crystals until the reduction of the nitro group is completed. The product is then isolated by neutralizing the excess of alkali, redissolved in water with the aid of sodium carbonate and tetrazotized by means of 138 parts of sodium nitrite and the necessary quantity of hydrochloric acid. The tetrazo body thus obtained is poured into a solution containing 220 parts of resorcin and sufficient sodium carbonate to render the reaction mixture alkaline. When the combination is completed the dyestuff is isolated by salting out and filtering. It dyes cotton in brown shades fast to acids, alkalis and light, and which on after treatment with formaldehyde become extremely fast to washing and to boiling soap.

Example III: 257 parts of metanitrobenzoylmetaphenylenediamin are diazotized and coupled with 239 parts of 2-amino-5-naphthol-7-sulfonic acid in soda alkaline solution. The monoazo compound is reduced and isolated as in Example I, redissolved in water, and tetrazotized by means of 138 parts of sodium nitrite and the necessary quantity of hydrochloric acid. The resulting tetrazo body is poured into a soda alkaline solution of 220 parts of resorcin and the mixture stirred until the combination is completed. The dyestuff is isolated by salting out and filtering. It dyes cotton in red shades of great fastness to acid, alkalis and light. On aftertreating with formaldehyde the dyeings are fixed extremely fast as in the preceding examples.

What we claim is:—

1. The process of producing orange, brown or red substantive dyestuffs capable of being fixed on vegetable fibers by aftertreatment with formaldehyde, which process consists in combining two molecules of resorcin with a tetrazo body having the general formula

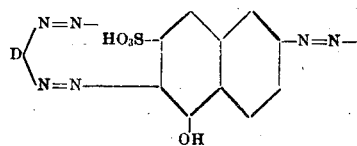

substantially as described.

2. Substantive dyestuffs capable of being fixed on vegetable fibers by aftertreatment with formaldehyde and which dyestuffs have been produced by combining two molecules of resorcin with a tetrazo body having the general formula

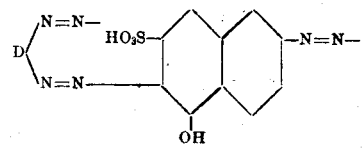

where D is the residue of the general constitution Ar.CO.NH.Ar.

In witness whereof we have hereunto set our hands in the presence of two subscribing witnesses.

HERBERT LEVINSTEIN.
JAMES BADDILEY.

Witnesses:
JOHN O'CONNELL,
WILLIAM GEO. HEYS.